No. 737,866. PATENTED SEPT. 1, 1903.
C. F. PIKE.
INDICATOR FOR LOCATING SUNKEN METALS.
APPLICATION FILED AUG. 22, 1902.
NO MODEL.
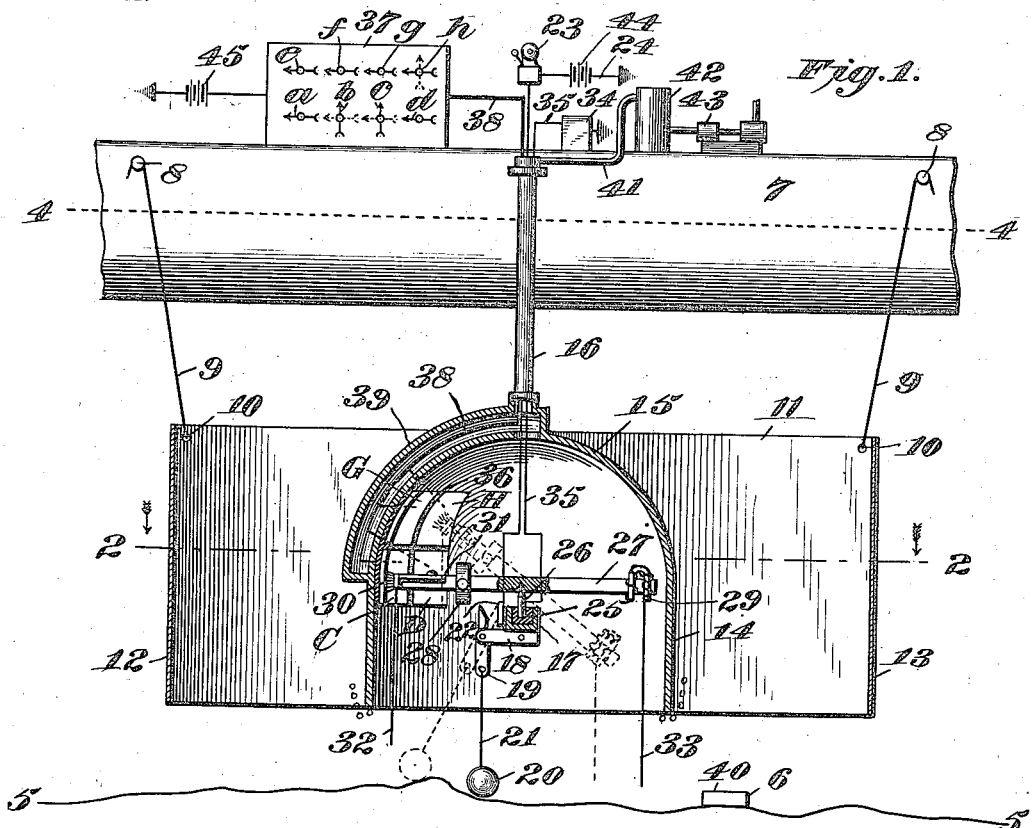
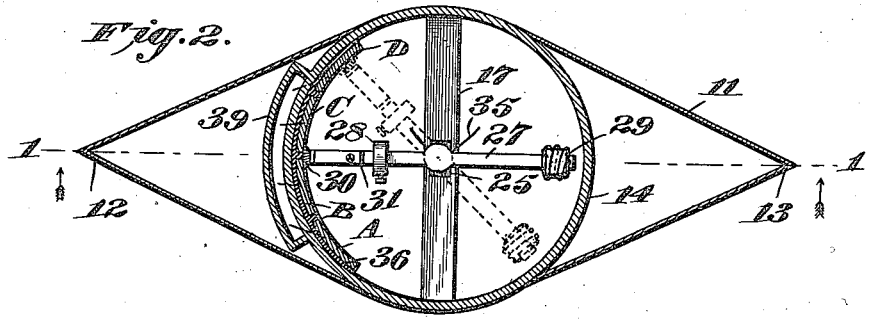
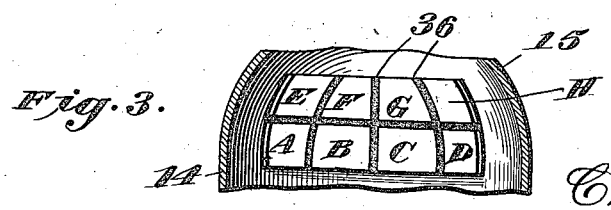
Witnesses
Inventor
Chas. F. Pike
By S. Brashears
Attorney No. 737,866. Patented September 1, 1903.

UNITED STATES PATENT OFFICE.

CHARLES F. PIKE, OF PHILADELPHIA, PENNSYLVANIA.

INDICATOR FOR LOCATING SUNKEN METALS.

SPECIFICATION forming part of Letters Patent No. 737,866, dated September 1, 1903.

Application filed August 22, 1902. Serial No. 120,715. (No model.)

*To all whom it may concern:*

Be it known that I, CHARLES F. PIKE, a citizen of the United States, residing at Philadelphia, in the county of Philadelphia and State of Pennsylvania, have invented certain new and useful Improvements in Indicators for Locating Sunken Metals, of which the following is a specification.

This invention relates to means whereby metals of a magnetic nature may be located when sunken in the waters of bays, lakes, rivers, or other bodies of water; and the invention has for its object to render the operation of such devices sure, reliable, and prompt.

With this object in view the invention consists in an improved indicator for the described purpose, the construction, arrangement, and combination of the parts of which will be first fully described hereinafter and the points of novelty afterward specifically pointed out in the appended claims.

In order that the construction and operation of my invention may be readily understood, I will now describe it in detail in connection with the accompanying drawings, in which—

Figure 1 represents a view of the apparatus, partly in section on the line 1 1 of Fig. 2 and partly in elevation, the apparatus being shown as suspended from a vessel into the water in position for operation. Fig. 2 represents a horizontal sectional view on the broken line 2 2 of Fig. 1 looking downward. Fig. 3 is fragmentary detail view illustrating the interior of a portion of the bell or dome top in elevation.

Like reference characters indicate the same parts wherever they occur in the various figures of the drawings.

Referring particularly to the drawings, 4 indicates the surface of the body of water in which the indicator is to be operated, 5 the ground at the bottom thereof, upon which the metallic bodies to be indicated are resting—as, for instance, at 6—and 7 a boat or other vessel in the water from which the indicator is to be suspended, and 8 8 cleats or other devices to which to attach ropes or cables 9 9, which are attached at their lower ends, as at 10 10, to the body 11 of the apparatus, thereby suspending the apparatus at any desired depth or distance from the bottom. The body 11 in horizontal plan is pointed at either end (best seen as at 12 13 in Fig. 2) to facilitate its passage through the water, the main central portion being preferably in the form of an upright cylinder 14, open at its lower end and provided at its upper end with a substantially semispherical cover or dome 15, the cylinder and dome being water and air tight, and a pipe 16, extending upward from the center of the dome of a length to reach above the surface of the water. A cross-beam or support 17 is fixed in the cylinder 14 and carries a bracket 18, and a lever 19 is pivoted to the end of said bracket, a weight, preferably a ball 20, being suspended from its lower end by a wire 21, reaching below the cylinder to normally maintain the lever in a vertical position. An insulated plate 22, secured to cross-beam 17, is connected with an electric bell 23 on the vessel 7 by means of a wire 24, passing through pipe 16, so that when the depth of the water decreases as the vessel moves along the ball 20 will be moved out of line—as, for instance, to the position shown in dotted lines in Fig. 1—whereby the upper end of lever 19 is caused to close the bell-circuit by contacting with plate 22, the wire 24 acting as a ground-wire, thus causing the bell to ring and give notice to the operator of the shoaling, whereupon, if deemed necessary, the body 11 may be raised or any other desired provision made against accident or damage.

Upon the cross-beam 17 is attached insulating material, as at 25, in which is erected a pivot-pin 26, upon which an indicator-bar 27 is mounted in a manner to permit it to oscillate vertically or horizontally, the balance of the bar being preserved by means of a weight 28, adjustably secured upon it. At one end of bar 27 is an electromagnet 29 and at the opposite end a brush 30, the latter being insulated from the bar by insulating material 31 and provided with a ground-wire 32, extending beyond the bottom of cylinder 14, the electromagnet being similarly provided with a ground-wire 33.

Any suitable source of electricity is provided on board the vessel, as at 34, from which a wire 35 extends through pipe 16 to the pivot-pin 26 and thence through bar 27 to electromagnet 29, so that when contact is made on deck the current will be completed through ground-wire 33, thus energizing the electromagnet 29.

That part of the interior of the dome within range of the brush 30 during the movements, as hereinafter described, of the indicator-bar 27 on the pivot-pin 26 is provided with two series of contact-plates, as at A B C D and E F G H, separated from each other and from the dome by insulating materials 36. On the vessel is an annunciator, as at 37, provided with two series of pointers, as at *a b c d* and *e f g h*, the number of pointers and their positions in the annunciator corresponding with the number and position of the contact-plates in the dome, which may be varied to suit varying conditions. Wires from the pointers contained in a cable 38 pass down through pipe 16, and a recess 39, provided on the dome to the contact-plates, the pointers *a b c d* being connected up in their respective order with contact-plates A B C D and pointers *e f g h* in a like manner with contact-plates E F G H.

The electromagnet being energized in the manner described, the apparatus is in working order, and the brush 30 when the indicator-bar 27 is in its normal position, as shown in full lines in Figs. 1 and 2, being in contact with plates B and C the circuit from pointers *b* and *c* will be completed through the cable-wires, the plates, the brush, and the ground-wire 32, and said pointers will assume vertical positions, in which they will remain as long as the indicator-bar 27 retains its normal horizontal position. So long as these pointers *b c* remain vertical the operator will know that there is no magnetic mass within the field of attraction of the magnet; but as soon as such a mass, as at 40, is approached it is attracted by the magnet and the nicely-balanced indicator-bar is drawn downward and also laterally, according to the position and bulk of the mass, thus causing the brush to move off of plates B and C—as, for instance, to plate H—whereupon the circuit from pointer *h* is completed, causing that pointer to assume a vertical position, as shown in dotted lines, indicating to the operator the position of the indicator-bar 16 and, the distance from the bottom being known, accurately indicating the position and bulk of the sunken mass, which can be marked by a buoy to direct the operations of a submarine diver, who may be afterward sent to make an examination. The cylinder is kept clear of water by air forced into it through a pipe 41, which passes from a reservoir (indicated at 42) and supplied by a pump, as at 43, down through pipe 16 into the dome, any surplus air passing out at the bottom of the cylinder in the form of bubbles, as indicated in Fig. 1. The pipe 41 and cable 38 are preferably made flexible to permit of the raising and lowering of the apparatus.

Suitable batteries for the bell and annunciator are indicated at 44 and 45, and the opposite poles of these batteries, as well as the source of electricity 34, are suitably grounded by wires in the well-known manner.

From the foregoing description it will be readily apparent that I have provided an indicator of simple and economic construction which will reliably indicate the position and bulk of all sunken masses of magnetic material, the parts automatically assuming their normal operative position as soon as the mass is passed.

While I have specifically described the construction and arrangement of the various parts, it is obvious I need not confine myself to such specific constructions, but may vary them within reasonable limits without departing from the spirit and scope of the invention.

Having thus fully described my invention, what I claim as new, and desire to secure by Letters Patent of the United States, is—

1. An apparatus of the character described comprising an open-bottom cylinder adapted to be suspended from a vessel, an indicator-bar pivotally mounted therein, a magnet on said bar, and means, on board the vessel, for indicating the position of the bar, substantially as described.

2. An apparatus of the character described comprising an open-bottom cylinder adapted to be suspended from a vessel, an indicator-bar pivotally mounted therein, a magnet on said bar, insulated contact-plates in the cylinder, an insulated brush on the indicator-bar, and an annunciator on board the vessel having pointers connected up with the contact-plates, substantially as described.

3. An apparatus of the character described comprising an open-bottom cylinder adapted to be suspended from a vessel, a pivoted indicator-bar in the cylinder, an electromagnet on the bar, a ground-wire depending from the magnet into the water below the cylinder, a source of electricity on board the vessel connected up with the magnet, and means on board the vessel for indicating the position of the indicator-bar, substantially as described.

4. An apparatus of the character described comprising an open-bottom cylinder adapted to be suspended from a vessel, an electric bell on board the vessel, and means for closing the bell-circuit when the apparatus is moved into shoal water, substantially as described.

5. An apparatus of the character described comprising an open-bottom cylinder adapted to be suspended from a vessel, an electric bell on board the vessel, a pivoted lever in the cylinder, a weight suspended from the lever by a wire extending into the water below the bell, and means for closing the bell-circuit when the weight drags on the bottom and moves the lever on its pivot, substantially as described.

6. An apparatus of the character described comprising an open-bottom cylinder adapted to be suspended from a vessel, a beam supported in the cylinder, a lever pivoted to the beam, a weight suspended by a wire from said lever, and adapted to move the lever laterally, an insulated contact-plate in the path of movement of the lever, an electric bell on board the vessel, and a connecting-wire between the bell and contact-plate, substantially as described.

7. An apparatus of the character described comprising an open-bottom cylinder adapted to be suspended from a vessel and provided with a dome-shaped top, an indicator-bar pivoted and swiveled in the cylinder, an electromagnet on one end of the bar, a brush on the other end of the bar, a plurality of series of contact-plates on the inside of the cylinder and its cover, an annunciator on board the vessel, a plurality of series of pointers on the annunciator corresponding in number and position with and connected up with the respective contact-plates, and a source of electricity on board the vessel connected up with the electromagnet, and ground-wires depending from the magnet and brush through the bottom of the cylinder, substantially as described.

8. An apparatus of the character described comprising an open-bottom cylinder adapted to be suspended from a vessel and having a closed top, a pipe leading from the top to above the water, a pivoted indicator-bar in the cylinder, an electromagnet and a brush on the bar, contact-plates in the cylinder, an annunciator, an electric bell, and a compressed-air supply on board the vessel, flexible wires passing from the annunciator and bell through the pipe into the cylinder, and a flexible air-pipe passing from the air-supply through the pipe into the cylinder, substantially as described.

In testimony whereof I affix my signature in presence of two witnesses.

CHARLES F. PIKE.

Witnesses:
R. H. WINTER,
WM. A. PIKE.